3,390,615
HYDRAULIC SERVO VALVE HAVING UNIFORM RESPONSE TO INPUT SIGNALS INDEPENDENT OF MAGNITUDE AND DIRECTION OF LOAD
Paul F. Hayner, Lexington, Mass., and Gerald Leon Bernier, Nashua, N.H., assignors to Sanders Associates, Inc., Nashua, N.H., a corporation of Delaware
Application Feb. 7, 1966, Ser. No. 525,566, now Patent No. 3,326,088, dated June 20, 1967, which is a division of application Ser. No. 306,854, Sept. 5, 1963, now Patent No. 3,282,168. Divided and this application May 26, 1967, Ser. No. 641,612
10 Claims. (Cl. 91—421)

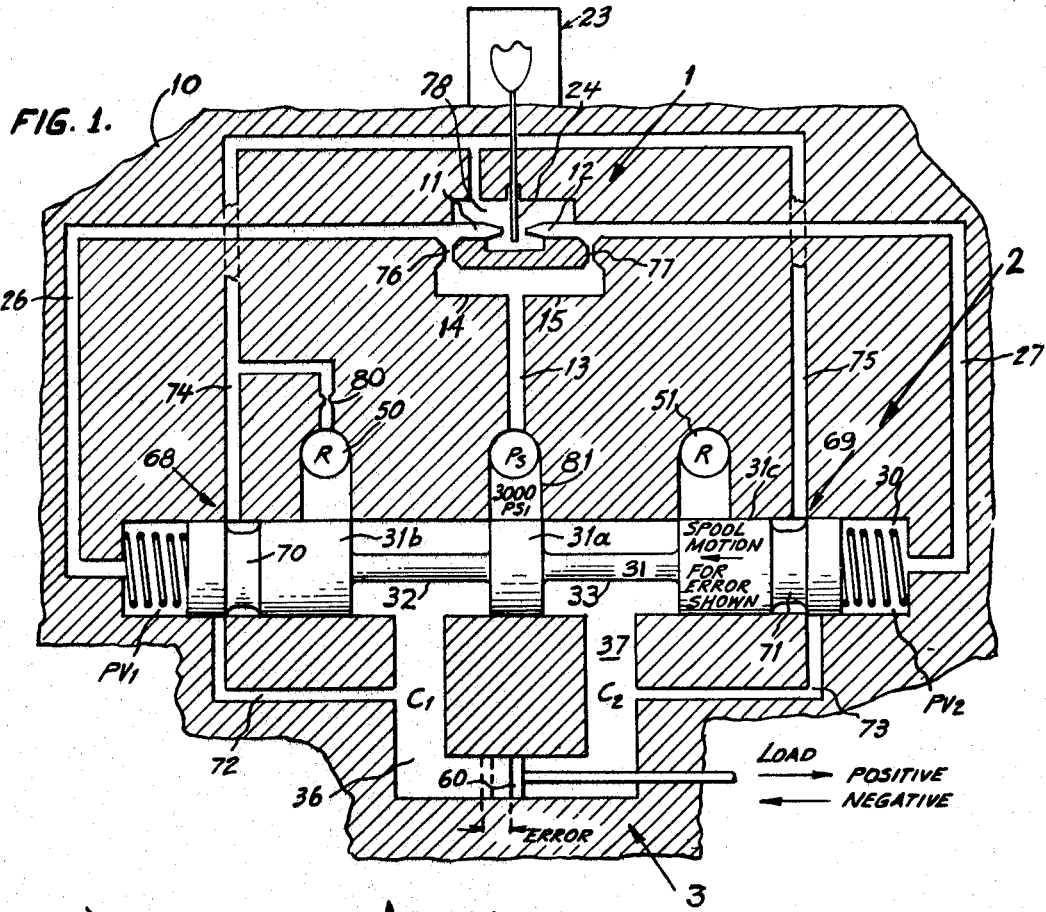

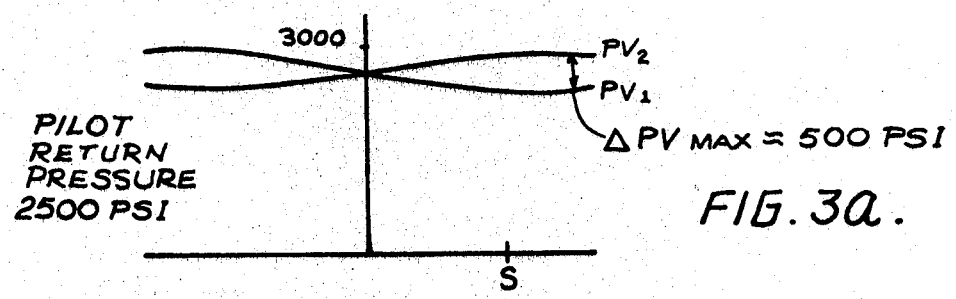
FIG. 3a.
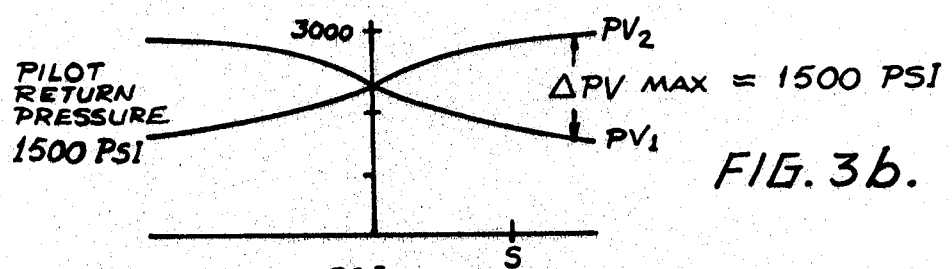
FIG. 3b.
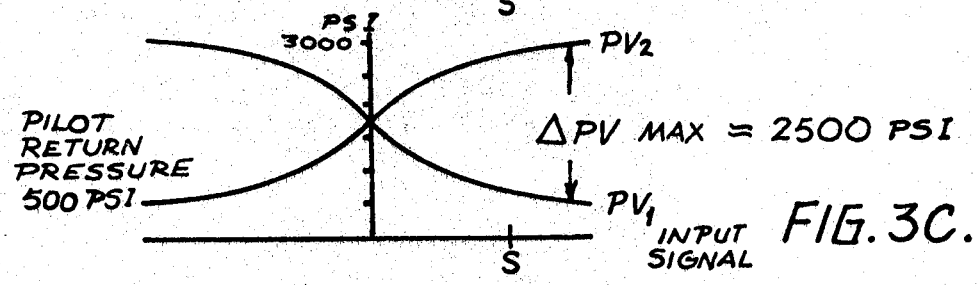
FIG. 3c.
| LOAD | LOAD EQUIV. MAX. | $PC_1$ | $PC_2$ | $\Delta P$ RESTRICTORS | $PV_2 - PV_1$ | MOTION |
|---|---|---|---|---|---|---|
| NEGATIVE | 2000 PSI | 2500 | 500 | 2500 | X | M |
| 0 | 0 | 1500 | 1500 | 1500 | 3X | 3M |
| POSITIVE | 2000 PSI | 500 | 2500 | 500 | 5X | 5M |
FIG. 2.
INVENTERS
PAUL F. HAYNER
GERALD LEON BERNIER
BY Philip D. Amino
ATTORNEY United States Patent Office 3,390,615
Patented July 2, 1968

ABSTRACT OF THE DISCLOSURE

A proportional position hydraulic control system is provided including a pilot device responsive to an input signal for producing a pressure differential which positions a servo valve metering fluid to a load actuator, with pressure feedback from the actuator through valves synchronized with the servo valve for biasing the pressure differential so that the servo valve restricts flow to the actuator as necessary to provide substantially uniform response of the actuator to the input signal regardless of the magnitude and direction of the load.

This application is a division of copending patent application Ser. No. 525,566 for "Hydraulic Servo Control Systems," filed Feb. 7, 1966, now Patent No. 3,326,088, which is a division of patent application Ser. No. 306,854 for "Hydraulic Servo Control System," filed Sept. 5, 1963, now Patent No. 3,282,168.

This invention relates to a hydraulic servo control system, and more particularly, to such systems employing proportional position servo valves characterized by low noise, high reliability, low leakage, and constant gain with temperature and load changes. While the invention has particular utility in submarine steering, diving, and hovering controls, wherein low noise and high reliability are important, it will be understood that it may be used in other environments wherein the above qualities are important.

Heretofore, hydraulic fluid flow rate to the output load actuator in proportional position servo valves varies with the magnitude of the load on the actuator and so the position response rate of the system varies with the magnitude of the output load. More particularly, a demand fed to the system to move against the held load is followed by slower response than a demand to move in the same direction as the held load.

It is an object of the present invention to provide such a system in which the output flow varies directly with the input signal, and is substantially independent of temperature and load;

It is another object to provide such a system providing load compensation to provide constant flow gain;

It is another object to provide such a system incorporating control line pressure sensing for load compensation, to provide substantially uniform response to an input signal for a substantial range of loads.

Still other objects and features of the present invention will be apparent from the following specific description taken in conjunction with the figures in which:

FIGURE 1 is a diagrammatic sectional view of a constant gain servo valve according to the invention;

FIGURE 2 is a table applicable to FIGURE 1;

FIGURES 3a, b, and c are curves of operation of the device each showing the relationship between input signal and the pressures on the servo valve spool at a different pilot return pressure; and FIGURE 4 is a similar series of curves of operation of the device in FIGURE 1 showing the relationship between input signal and pressure differential on the output control spool.

Referring to the figures, there is shown structure and operating characteristics of a useful embodiment of the present invention. The embodiment is a hydraulic servo control system which responds to an electrical input signal by converting the input signal to an equivalent pressure differential which positions a servo valve controlling hydraulic fluid flow to a hydraulic load actuator.

Heretofore, in systems of a similar type, the hydraulic fluid flow rate to the load actuator would vary with the size of load the actuator holds and so the position response rate of the system to an input signal would vary with the output load. The present invention, as illustrated in the embodiment, includes feedback means whereby this defect of prior systems is substantially overcome.

Referring now to FIG. 1, 10 designates the valve casing, or housing, enclosing a pilot device 1, a servo valve 2 and output actuator 3. The pilot includes control jets 11 and 12, to which liquid under supply pressure $P_s$ is supplied from pilot supply line 13 through lines 14 and 15 and restrictors 76 and 77 to adjacent jets 11 and 12. These constitute a hydraulic amplifier.

Mounted on top of casing 10 is the electromagnetic control housing indicated generally by the reference numeral 23, containing, for example, the coils and pole pieces (not shown) which control the position of flapper 24. The electrical input signal is applied to the coils causing the flapper 24 to move from left to right or vice versa to abut jet 11 or 12. Thus, the pressures $PV_1$ and $PV_2$ in lines 26 and 27 are controlled by the input signal. These lines lead to opposite ends of piston servo chamber 30 containing the spring centered servo valve piston 31, which is arranged for axial motion to control and meter the flow of fluid to the output load actuator. —Thus the pressure differential $\Delta PV = PV_1 - PV_2$ represents the input signal and positions the servo valve 2.

The servo valve piston 31 has two reduced portions 32 and 33 intermediate its ends defining annular cavities which connect with conduits 36 and 37 leading to the output actuator 3.

In neutral or null position, as shown in FIG. 1, the piston 31 is midway of its travel, and pilot supply line 13 and return lines 50 and 51 are closed. As the servo piston 31 moves to the left, supply pressure line 81 is opened to control line 37, return line 51 is closed, and return line 50 is opened, the area of the openings being proportional to movement of the piston from center position. As the piston 31 moves to the right from the central position, supply pressure $P_s$ is fed into control conduit 36, return line 50 is closed, and return line 51 is opened. In either case, fluid flow passes through control conduit 36 in one direction or the other, and actuates the ram 60 in the output load actuator 3.

The feedback mentioned above in the embodiment described herein consists essentially of means for biasing the pressure differential equivalent of a given input signal in accordance with the magnitude and direction of the load held by ram 60, so that the pressure differential positions the servo valve piston 31 as necessary to deliver a given hydraulic fluid flow rate to the output load actuator. For example, if an input of given magnitude applied to the flapper valve control calls for the load actuator 3 to move against a very heavy held load, the pressure differential $(PV_1 - PV_2)$ is biased to a higher value in the appropriate direction than if the load were light and so the servo valve piston 31 opens more in the appropriate direction than it would if the load were light. Thus, the same fluid flow rate is metered to the output load actuator 3 regardless of the magnitude of the load.

The input signal in the embodiment described herein is converted into an equivalent pressure differential ΔPV in the pilot device 1. This differential is applied across the servo valve 2 to position the valve. Feedback valves 68 and 69 ganged with the servo valve connect opposite sides of the output actuator 3 to the pilot 1 feeding a pressure thereto which biases the differential ΔPV produced in the pilot device. Thus, the amount the servo valve opens is determined by the load on the output actuator.

In the heretofore known systems, the position of the servo valve piston or spool has been a function of input command only. If the loading changed the effective pressure drop across the servo valve restriction, the flow to the output actuator changed and likewise the flow gain changed.

In the present invention, piston 31 or spool position is made a function of loading, as well as of input command signal. The direction of loading is sensed and the control line pressure is used to compensate for loads by adjusting the pressure differential across the piston or spool. Spool position may also be made a function of temperature by the use of laminar restrictors in the pilot stage. These restrictors respond to the temperature changes and cause spool differential pressures to vary accordingly, as described in the above mentioned patent application Ser. No. 525,566.

In FIG. 1, land 31b of spool 31 is provided with a circumferential groove 70, and land 31c with a similar groove 71. Conduit 72 leads from control line 36 ($C_1$) to conduit 74 connected directly to flapper return chamber 78 and conduit 75 also connected directly to flapper return chamber 78. Both said conduits are closed when spool 31 is in null position.

Pilot supply line 13 leads through restrictors 76 and 77 to jets 11 and 12. The dotted position of the piston 60 is the desired piston position for which a correcting input signal S (FIG. 4) is sent to the flapper control magnet. This signal causes the flapper to move to the right as viewed in FIG. 1. As a result, the pressure in conduit 27 is increased, and the pressure in conduit 26 is decreased, making $PV_1-PV_2$ negative, and causing the piston 31 to move to the left as viewed in FIG. 1. This opens the supply port to conduit 37, the return port to conduit 36, and moves the output load piston 60 to the desired dotted position. When the error is eliminated, the error signal disappears, the flapper returns to null position, equalizing the pressures in conduits 26 and 27 and allowing the servo piston 31 to return to the null position. This closes off the control conduits 36 and 37, stopping the motion of load piston 60 at the correct position. The error is eliminated when the load piston 60 is moved to the desired dotted position, as shown in FIG. 1, and the error signal provided by the flapper 24 disappears due to the removal of the input signal to the flapper. More particularly, when the load piston 60 has moved to the dotted position, a signal is fed back from the load piston to the electromagnetic control housing 23 which removes the input signal S (shown in FIG. 4) applied to the flapper 24, thereby permitting the flapper to return to its neutral position intermediate the control jets 11 and 12, as described in detail in the aforementioned parent application now U.S. Patent No. 3,282,168.

Whenever the servo piston 31 is not at null position, it can be seen in FIG. 1 that the pilot return chamber 78 is connected through grooves 70 and 71 to one or the other of the control lines 36 and 37. Here, motion of the servo piston 31 to the left connects the pilot return chamber 78 to control line 36.

It is herein to be noted that the pressure in the pilot return chamber 78 is always slightly higher than the pressure in either of the control lines 36 or 37. Thus, the fluid flow is always from the chamber 78 to the control line 36 or 37 through the grooves 70 or 71, respectively.

FIGS. 3a to 3c show the effect of pilot return pressure on the piston control pressures $PV_1$ and $PV_2$. It can be seen that, for the same input signals, the greatest pressure differential across the servo piston 31 (and hence the greatest piston motion) occurs when the pilot return pressure is the lowest. This result is depicted more simply in FIG. 3c.

In FIG. 4 the ordinate represents the pressure differential on spool 31, $PV_1-PV_2$, and is plotted against input signals as the abscissae. Curve A shows conditions for negative load, curve B for no load, and curve C for positive load. From this it is shown graphically that for negative load the pressure differential is the least over the load range, for positive load it is the greatest, and for no load it is intermediate.

When the load on load piston 60 is positive (i.e., resisting the desired direction of travel), it is desired that the servo piston 31 move through its greatest travel, thus lowering the pressure drop across the land 31a, resulting in increased pressure in conduit 37 being brought to bear on the load. This is accomplished by pressure feedback from the control lines to the pilot return chamber 78. With a positive load, the lower pressure of control line 36 feeds back to the pilot return chamber 78 and results in operation along curve C of FIG. 4. As discussed previously, although the lower pressure in control line 36 is fed back to the pilot return chamber 78, the chamber pressure remains slightly higher than that of the control line, whereby the fluid flow is from the chamber 78 to the control line 36. It can be seen that this causes a larger motion of the piston 31 because of the larger ΔPV. Should the load become negative (aiding the desired direction of travel), the pilot return pressure increases due to increased pressure in conduit 36, and operation takes place in accordance with curve A of FIG. 4. The lower ΔPV for the given signal results in smaller travel of the piston 31 and lower pressures in conduit 37 acting on the load piston 60.

It can be seen that, as a result of this load feedback, output motion is smoothed out and does not vary widely with loading conditions.

The pilot stage requires continuous fluid flow for its operation, and so a return restriction 80 is provided. The restriction is such that when the piston is in null position and the conduits 26 and 27 are shut off, the pressure in the pilot return chamber 78 builds up to 2500 p.s.i. or equivalent to that encountered in the chamber under negative loading. Thus, when operation begins under negative loading conditions, no discontinuity is observed when moving off null position, since the return chamber pressure is already at the desired value. Under positive loading, the return chamber pressure decreases to that of control line as the piston moves off null and operation moves from curve A to curve C of FIG. 4, just as in the case of an actual load change on the load piston 60.

The restriction 80 need not necessarily take the form shown. The same effect could be accomplished by sufficiently underlapping of the lands on piston 31 so as to provide the desired leakage. The magnitude of flow in the pilot stage is usually quite small compared to that in the control lines 36 and 37, so that underlaps sufficient to provide pilot stage leakage will result in quite adequate performance.

Another manner in which flow can be maintained is by dithering. If piston 31 is maintained in constant small oscillatory motion by application of dithering to the input signal, both control lines 36 and 37 will essentially be sampled and this average pressure will be reflected in pilot return chamber 78. It is again to be recalled that very little motion of the piston 31 will be required to permit pilot stage flow and that this amount of leakage will result in negligible motion of load piston 60.

Referring to the table, FIG. 2, the first column indicates the load, negative, zero, or positive; column 2 indicates the load equivalent maximum for three conditions respectively, i.e., 2000 p.s.i., zero, and 2000 p.s.i. The third column is the pressure in conduit 36 in p.s.i. for the three conditions, i.e., 2500, 1500, and 500; the fourth column the pressure in conduit 37 for the same three conditions, namely, 500, 1500, and 2500.

Column 5 shows ΔP at the restrictors for the same three conditions, to wit, 2500, 1500, and 500. Column 6 shows $PV_2-PV_1$ (the pressures at opposite ends of the spool 31) relatively for the three conditions above as X, 3X, and 5X, and column 7 the relative motions produced by these pressures, i.e., M, 3M, and 5M.

The foregoing described certain preferred embodiments of the present invention, and a suitable mode for practicing the same, but it should be understood that modifications and changes may be made without departing from the spirit and scope thereof.

What is claimed is:
1. A hydraulic system having
 a source of input signal,
 a pilot device responsive to said signal for producing control pressures representative thereof,
 a servo valve responsive to said control pressures, and
 a load actuator to which hydraulic fluid is metered by said servo valve;
 wherein the improvement comprises,
 means for biasing said control pressures in accordance with the magnitude and direction of the load on said load actuator,
 said means for biasing including at least one feedback valve connected from said load actuator to said pilot device to provide fluid flow therebetween,
 whereby the response of said actuator to said input signal is substantially independent of the magnitude and direction of said load.
2. A hydraulic system as in claim 1 and in which, said feedback valve is synchronized with said servo valve.
3. A hydraulic system as in claim 2 and in which,
 said feedback valve opens only when said servo valve meters hydraulic fluid to said load actuator in a given direction.
4. A hydraulic system as in claim 1 and in which,
 said means for biasing includes two feedback valves connected from said load actuator to said pilot device to provide fluid flow therebetween.
5. A hydraulic system as in claim 4 and in which,
 one of said feedback valves opens only when said servo valve meters hydraulic fluid to said load actuator in one direction, and
 the other feedback valve opens only when said servo valve meters hydraulic fluid to said load actuator in another direction.
6. A hydraulic system as in claim 5 and in which,
 said servo valve is of the spool type, and
 said feedback valves are ganged therewith.
7. A hydraulic system as in claim 5 and in which,
 said pilot device includes a flapper valve having two nozzles for producing two control pressures which are applied to opposite sides of said servo valve spool so that the differential between said control pressures determines the position of said spool.
8. A hydraulic system as in claim 7 and in which,
 each of said nozzles has an inlet side and a discharge side, and
 said feedback valves when open provide fluid pressure from said actuator to the discharge side of said flapper valve nozzles,
 thereby biasing said control pressures and said differential pressure.
9. A hydraulic system as in claim 8 and in which,
 said feedback valves connect with opposite sides of said load actuator, and
 said feedback valves are synchronized with said servo valve so that only the pressure on the low pressure side of said actuator connects to said flapper valve nozzle discharge side.
10. A hydraulic system as in claim 9 and further including,
 means for maintaining a pressure differential across said flapper valve nozzles when said feedback valves are closed.

References Cited

UNITED STATES PATENTS

| | | | |
|---|---|---|---|
| 2,931,389 | 4/1960 | Moog et al. | 91—433 |
| 2,964,059 | 12/1960 | Geyer | 137—625.62 |
| 3,054,388 | 9/1962 | Blanton | 91—388 |
| 3,095,906 | 7/1963 | Kolm | 137—625.62 |
| 3,211,063 | 10/1965 | Seamone | 91—388 |

FOREIGN PATENTS

| | | |
|---|---|---|
| 672,800 | 8/1960 | Canada. |

PAUL E. MASLOUSKY, *Primary Examiner.*